United States Patent [19]

Powers et al.

[11] 4,074,035

[45] Feb. 14, 1978

[54] HALOMETHYLATED AROMATIC INTERPOLYMERS

[75] Inventors: Kenneth W. Powers, Berkeley Heights; Irving Kuntz, Linden, both of N.J.

[73] Assignee: Exxon Research & Engineering Co., Linden, N.J.

[21] Appl. No.: 570,352

[22] Filed: Apr. 22, 1975

[51] Int. Cl.$^2$ .......................... C08F 4/14; C08F 4/42; C08F 212/00
[52] U.S. Cl. ...................... 526/185; 260/29.2 R; 260/DIG. 31; 526/17; 526/27; 526/30; 526/49; 526/196; 526/238; 526/293
[58] Field of Search .................. 260/87.5 R, 91.5 R, 260/80.77; 526/238, 185

[56] References Cited

U.S. PATENT DOCUMENTS

| | | | |
|---|---|---|---|
| 2,974,126 | 3/1961 | Kelley | 526/59 |
| 3,067,182 | 12/1962 | Jones | 526/17 |

OTHER PUBLICATIONS

Jones, G. D. et al., J. Appl. Polymer Sci., 5, 452–459 (1961), from Chem. Abst., 56, 10373(d).
Sadykhov, Z. A. et al., Chem. Abst., 73, 110361(h).
Belgium 656,379, from Chem. Abst., 65, 826(c).

*Primary Examiner*—Christopher A. Henderson
*Attorney, Agent, or Firm*—H. E. Naylor; John J. Mahon

[57] ABSTRACT

A continuous process for the preparation of gel-free interpolymers from monomers comprising one or more halomethylated vinyl aromatic compounds and one or more Type III monoolefins is characterized by the use of a solvent or mixture of solvents in which the reactants and the interpolymers are soluble; a soluble Lewis acid or Friedel-Crafts catalyst, especially an organo-Group IIIa element halide catalyst; a reaction temperature in the range of $-120°$ C to $-20°$ C; and a conversion of at least one of the monomers to interpolymer in excess of 85 percent. The interpolymers may be cross-linked with nucleophilic reagents to produce elastomeric compositions; quaternized with nitrogen, sulfur or phosphorous compounds to give self-emulsifying latices useful as surface coatings or converted to sulfonic or carboxylic derivatives for the preparation of ionomer resins. The interpolymers are also versatile intermediates which enable the preparation by simple substitution reactions of a wide range of functional-group containing elastomers especially useful in adhesive applications, and as flexibilizers for brittle functional-group containing plastics such as epoxies and amino resins.

2 Claims, No Drawings

HALOMETHYLATED AROMATIC INTERPOLYMERS

FIELD OF THE INVENTION

This invention relates to a process for the preparation of interpolymers from monomers comprising one or more halomethylated vinyl aromatic compounds, such as meta or para-chloromethyl styrene or mixtures thereof; and one or more $C_4$ to $C_{18}$ Type III monoolefins such as isobutylene or 2-methyl-1-pentene. More particularly, this invention relates to the preparation of interpolymers, having a variety of end uses, from said monomers with the aid of a Friedel-Crafts catalyst, especially an organo-Group IIIa element catalyst such as an alkyl aluminum halide or alkyl boron halide. Most particularly, this invention relates to a continuous process for the preparation of gel-free interpolymers from said monomers in a solvent or mixture of solvents in which the monomers, catalyst components and the interpolymers produced therefrom are soluble, by reaction at a temperature in the range of about $-120$ C to about $-20°$ C; and for a residence time in the reaction zone to insure conversion of at least one of the monomers to interpolymers in an amount equal to or greater than about 85 percent, said interpolymers containing not less than 0.5, nor more than 5.0 mole percent of said halomethyl vinyl aromatic compound incorporated therein.

The interpolymers made by the continuous process of this invention crosslink readily with nucleophilic reagents at moderate temperatures to give vulcanizates having good tensile strength, elongation and modulus having utility as general or special purpose elastomers. They may also be blended, prior to crosslinking, with halogenated polymers such as halogenated polyolefins; halogenated butyl rubber; halogenated terpolymers such as the brominated EPDM described in U.S. Pat. No. 3,524,826; sulfochlorinated polyolefins such as HYPALON; polychloroprenes such as NEOPRENE; and epichlorohydrin rubbers. Such blends may also include process oils, plasticizers, resins, fillers and reinforcing agents.

The highly reactive nature of the halogen in a holomethyl group attached to an aromatic ring not only facilitates crosslinking at moderate vulcanization temperatures but provides a means for conversion of the halomethyl moiety to a variety of derivatives having increased utility. For example, reaction of the halomethylated vinyl aromatic-olefin interpolymers made by the process of this invention with reagents well known to those having ordinary skill in the chemical arts permits conversion in whole or in part to a cyanomethyl group; hydroxymethyl group; aldehyde group; carboxy group; carboxymethyl group; thiomethyl group; aminomethyl group; alkoxymethyl group; and methylene ester of a carboxylic acid. Of particular utility are quaternary nitrogen, sulfur and phosphorous compounds which yield self-emulsifying cationic latices which are useful as surface coatings; and carboxy, carboxymethyl, and halogen replaced sulfonic acids which when crosslinked with an inorganic cation yield ionomer resins. The ease with which desired functional groups can be introduced into these elastomeric interpolymers makes them extremely useful in adhesives since the appropriate functional group can be introduced to promote specific chemical adhesion to almost any desired substrate. Functional groups can also be introduced to enhance compatibility with other polymers so these functional derivatives of the halomethylated vinyl aromatic olefin interpolymers are useful as impact improvers or flexibilizers for other brittle polymers such as epoxies, amino resins and so forth.

The halomethyl moiety is also readily replaced by polyfunctional reagents such as triethanol amine, ethylene polyamines, or polyhydroxy derivatives to introduce clusters of functional groups into the polymer chain. Derivatives of this type are especially useful as multifunctional lube oil additives.

DESCRIPTION OF THE PRIOR ART

Copolymers of vinyl benzyl chloride (VBC) and isobutylene using aluminum chloride or boron fluoride catalysts have been prepared in batch slurry polymerizations using ethyl chloride as a solvent at conversion levels below 70 percent and are reported by Jones et al in Ind. Eng. Chem. 53, 294 (1961); J. Appl. Poly Sci. V, No. 16, 452 (1961); and in U.S. Pat. No. 3,067,182. As noted by the authors, difficulty was experienced in obtaining polymers of uniform composition at high conversion levels. Analysis of the prior work indicated that crosslinked and alkylated products resulted from the use of a batch slurry process. Further work, resulting in this invention, showed that gel-free, uniform polymers could be prepared at high conversion levels in a continuous homogeneous solution process.

SUMMARY OF THE INVENTION

In distinction to the products and the processes of the prior art we have now found that interpolymers comprising one or more $C_4$ to $C_{18}$ Type III monoolefins and from about 0.5 to about 5.0 mole percent of one or more halomethylated vinyl aromatic compounds may be prepared in a continuous solution process utilizing a solvent or mixed solvent system in which the monomers, catalyst components and interpolymers are soluble; a preferred catalyst having the general formula $R_mMX_n$ wherein M is an element selected from Group IIIa of the Periodic Table of the Elements, R is a monovalent hydrocarbon radical selected from the group consisting of $C_1$ to $C_{12}$ alkyl, aryl, alkylaryl, arylalkyl and cycloalkyl radicals, m is a number from 0 to 2, X is a halogen independently selected from the group consisting of fluorine, chlorine, bromine and iodine, and the sum of m and n is equal to 3; a temperature in the range of about $-120°$ C to about $-20°$ C; and a conversion level of at least one of the monomers to interpolymer in the range of about 85 to 100 percent.

DESCRIPTION OF PREFERRED EMBODIMENTS

1. Monomers

A. Olefins

Olefins suitable for the practice of this invention have the general formula: $R'(R'')C = CH_2$ wherein R' and R" are independently selected from the group consisting of $C_1$ to $C_{15}$ alkyl, aryl, alkylaryl, arylalkyl and cycloalkyl radicals. Nonlimiting examples include: isobutylene; 2,3-dimethyl-1-butene; 2,4,4-trimethyl-1-pentene; 2,6-dimethyl-1-octene; 4-isopropenyl toluene; isopropenyl cyclohexane; and α-methylstyrene.

While Type III olefins comprise olefins which are essential to the practice of this invention, other olefins such as styrene, vinyl cyclohexane and vinylidene chloride may be included in the mixture of monomers fed to the reaction zone. Type III olefins are defined in accordance with the Board Classification described by Schmidt and Boord, J.A.C.S. 54 751 (1932).

B. Halomethylated Aromatic Compounds Halomethylated aromatic vinyl compounds suitable for the practice of this invention have the general formula $CH_2 = CR - R''' — CH_2 X$ wherein R is H or $CH_3$ and wherein R''' is a mono or polynuclear arylene radial and X is a halogen selected from the group consisting of chlorine and bromine. The arylene radical R''' may comprise a single ring such as benzene; interconnected single rings such as biphenyl; fused rings such as naphthalene or fused ring compounds in which at least one ring is aromatic such as tetralin. Nonlimiting examples include: 1-vinyl-3-chloromethyl benzene; 1-vinyl-4-chloromethyl benzene; 4-vinyl-4'-chloromethyl biphenyl; 1-vinyl-4-chloromethyl naphthalene; 5-vinyl-8-chloromethyl tetralin; 4-vinyl-7-chloromethyl indan; 1-isopropenyl-3-chloromethyl benzene; 1-isopropenyl-4-chloromethyl benzene; 1-vinyl-4-methyl-3-chloromethyl benzene; 1-isopropenyl-3-chloromethyl-4-methyl benzene; 4-vinyl-4-chloromethyl bibenzyl; etc. Of particular utility is a commercially available chloromethylated styrene sold as VBC (vinyl benzyl chloride) consisting of about 60 wt. percent of the meta isomer and 40 wt. percent of the para isomer.

II. Catalysts

Soluble Friedel-Crafts catalysts are generally applicable in the practice of this invention, but the preferred catalysts are those showing good polymerization activity with a minimum tendency to promote transfer and alkylation reactions involving the aromatic halomethyl groups since these reactions lead to branching and the production of crosslinks resulting in gel-containing polymers with inferior properties. The preferred catalysts have the general formula $R_mMX_n$ wherein M is an element selected from Group IIIa of the Periodic Table of the Elements; R is a monovalent hydrocarbon radical selected from the group consisting of $C_1$ to $C_{12}$ alkyl, aryl, alkylaryl, arylalkyl and cycloalkyl radicals; m is a number from 0 to 2; X is a halogen independently selected from the group consisting of fluorine, chlorine, bromine and iodine; and the sum of m and n is equal to 3. Nonlimiting exampls include: aluminum chloride, aluminum bromide, aluminum iodide, boron trifluoride, ethyl aluminum dichloride ($EtAlCl_2$); diethyl aluminum chloride ($Et_2AlCl$); ethyl aluminum sesquichloride ($Et_{1.5}AlCl_{1.5}$); dimethyl boron bromide ($Me_2BBr$); dimethyl boron iodide ($Me_2BI$); phenyl boron dichloride ($PhBCl_2$); and ethyl boron sesquifluoride ($Et_{1.5}BF_{1.5}$).

III. Solvents

Suitable media for dissolving the monomers, catalyst components and polymeric reaction products include the general group of aliphatic and aromatic hydrocarbons, used singly or in admixture, and $C_1$ to $C_6$ halogenated hydrocarbons used in admixture with hydrocarbon solvents in an amount up to about 25 percent by volume of the total solvent fed to the reaction zone. In contrast to the processes of the prior art in which a slurry of polymer is formed in the solvents employed therein, the process of the instant invention utilizes a homogeneous solution process and conversion of at least one of the monomers to interpolymer which is equal to or greater than 85 percent and approaches the theoretical 100 percent. Accordingly, the amount of solvent fed to the reaction zone will be sufficient to maintain the concentration of polymer in the cement leaving the reaction zone below about 20 weight percent, preferably in the range of about 2 to about 10 weight percent depending on the molecular weight of the polymer being produced. Higher concentrations of polymer are undesirable for several reasons including poor temperature control, rapid reactor fouling, and the production of gel. Higher polymer concentrations raise cement viscosity in the reactor and require excessive power input to insure good mixing and to maintain effective heat transfer. Inadequate mixing and loss of heat transfer efficiency results in localized high monomer concentrations and hot spots in the reactor which cause fouling of reactor surfaces. Higher polymer concentrations also increase gel production by permitting crosslinking to occur via alkylation reactions involving the aromatic halomethyl groups already incorporated in growing polymer molecules. This increased tendency for crosslinking to occur at high polymer concentrations is one of the major reasons the slurry processes utilized in prior art are unsuitable for the practice of this invention. The local polymer concentrations within a slurry particle is, of course, very high and results in considerable gel formation when conventional slurry processes are employed—hence the need for producing the polymers by homogeneous solution polymerization at low to moderate polymer concentrations.

Nonlimiting examples of solvents which may be used alone or in admixture include: propane; butane; pentane; cyclopentane; hexane; methyl cyclopentane; toluene; heptane; and isoöctane. Methyl chloride and methylene chloride are useful in admixture in amounts up to about 25 percent by volume.

IV. Process Conditions

The interpolymers of this invention are prepared in a fully continuous homogeneous solution process utilizing a solvent or mixture of solvents in which the monomers, catalyst components and polymers reaction products are soluble. In a typical process, a baffled tank-type reactor fitted with efficient agitation means such as a turbo-mixer or propeller and draft-tube, external cooling jacket and internal cooling coils, inlet pipes for monomers, catalyst and solvent, temperature sensing means and an effluent overflow to a holding drum or quench tank is purged of air and moisture by displacement with dry oxygen-free nitrogen, argon or low-boiling, olefin-free hydrocarbon vapors such as methane, ethane or propane and charged with dry, purified solvent or mixture of solvents.

Monomers and catalyst components, prediluted with solvent if desired, and additional solvent to maintain the desired concentration of polymer in the cement leaving the reactor through the effluent overflow pipe are fed to the stirred reactor either simultaneously or sequentially to form a reaction zone at a rate consistent with the means used for heat exchange to maintain the desired temperature range and residence time required to complete the polymerization. Pressure in the reactor is maintained at a level sufficient to keep the reactants in the liquid phase.

Temperatures at which the polymerization may be conducted may range from about $-120°$ C to about $-20°$ C. Preferred are temperatures in the range of about $-120°$ C to about $-50°$ C. Most preferred are temperatures in the range of about $-100°$ C to about $-80°$ C.

Reaction time may vary depending on the reactivity of the particular monomers, concentration of monomers and catalyst in solution and the temperature at which the polymerization is carried out. Higher concentrations of catalyst and higher temperatures enable higher monomer concentrations to be employed and favor the production of low molecular weight interpolymers which are useful for the preparation of mastics; whereas low concentrations of catalyst and low temperatures of reaction necessitate the use of lower monomer concentrations and favor the production of high molecular weight interpolymers, suitable for use as elastomers. Accordingly, polymerization times may vary from as little as 1 minute to about 6 hours. Preferred are reaction times in the range of about 5 minutes to about one hour. Most preferred are reaction times in the range of about 10 minutes to about one-half hour.

In general it is preferred to maintain the concentration of the monomers on the total feed to the reaction zone in an amount equal to or less than about 20 weight percent and conversion of at least one of the monomers equal to or greater than 85 percent so that a low steady-state concentration of unreacted halomethylated vinyl aromatic monomer is present in the reaction zone and so that polymer concentration is kept reasonably low as above discussed. Higher steady-state concentrations of unreacted halomethylated vinyl aromatic monomer in the reaction zone favor alkylation and transfer reactions which result in crosslinking and gel formation. Higher concentrations of polymer in the cement cause problems with poor temperature control, reactor fouling, build up of polymerization poisons and gel formation. Most preferred, are concentrations based on the total feed to the reactor of about 2 to about 15 weight percent of monomers and about 85 to about 98 weight percent of solvent or mixed solvent.

Using the above temperatures, times and concentration of monomers, a concentration in the range of about 0.001 to about 0.05 weight percent of catalyst on the total of the monomers and solvents fed to the reactor yields gel-free polymers having desired properties.

Isolation and recovery of the interpolymer at the completion of the reaction may be accomplished in a variety of ways. In a preferred embodiment, the homogeneous cement solution is fed from the reactor effluent or holding drum to a mixing drum or quench tank where the reaction mixture is mixed either in line or in the mixing drum or tank with a lower alcohol such as ethanol or isopropanol in order to deactivate or quench the catalyst. The alcohol may optionally contain a sequestering agent such as ethylene diamine tetraacetic acid or its disodium salt, or acetylacetone, or a soluble base such as sodium methylate. Deactivation of the catalyst in the manner indicated is preferred but other methods of quenching the catalyst such as injection of wet hexane or other diluent containing a catalyst complexing agent may also be employed if desired. Catalyst quenching is preferably accomplished rapidly while the cement is still cold so that formation of gel or of low molecular weight polymer is avoided.

The quenched polymer cement solution is fed to an agitated wash drum where it is mixed with water, or optionally a dilute aqueous solution of an acid such as hydrochloric acid in order to deash the polymer. Acid treatment followed by thorough water washing under efficient agitation is repeated if necessary so as to obtain a polymer having a minimal ash content.

Final isolation of the polymer is accomplished by feeding the polymer solution to a slurry flash drum where it is treated with steam and hot water to precipitate the polymer and vaporize the solvent. Typically, antioxidants, stabilizers and slurry aids are added to the polymer solution before slurrying and removal of solvent. The water slurry of polymer is finally fed to dewatering and drying extruders before packaging in bale or crumb form. Solvents, vaporized in the slurry flash drum are dried, purified and recycled to the solvent storage drums.

V. Crosslinking Reagents

Generally, the same nucleophilic reagents which are used for crosslinking and vulcanizing halogenated hydrocarbon elastomers, such as halogenated butyl rubber, such as chloronated or brominated butyl rubber, chloroprene rubber, chlorosulfonated polyethylene rubber, etc. may be used for crosslinking the halomethylated aromatic vinyl-olefin interpolymers of the instant invention. Preferred are nucleophilic compounds containing nitrogen or sulfur or both in the molecule, a comprehensive list of which may be found in "Materials and Compounding Ingredients for Rubber and Plastics," published annually by Rubber World, New York, N. Y.

Nonlimiting examples include: diamines, diamine carbamates, ethyleneimine derived polyamines, alkylated thioureas particularly the N, N'-dialkylthioureas, 2-mercaptoimidazoline, catechol salts, particularly dicatechol borates, polymethylolphenol resins and their halogenated derivatives.

The following examples more fully illustrate the invention and demonstrate the advance over the prior art.

EXAMPLE 1

Continuous Solution Polymerization

A baffled one-gallon tank-type stainless-steel reactor fitted with a down-thrust propeller and draft tube mixing assembly; two feed inlet tubes terminating in the reactor in the annulus of the draft tube; an internal cooling coil and external cooling jacket through which a refrigerated cooling medium could be circulated automatically as controlled by a thermocouple immersed in the reaction zone to maintain the reaction temperature at a preset desired level; a drain line; and an effluent overflow line was arranged for a continuous run after thoroughly drying the equipment and purging it with dry oxygen-free nitrogen. Four feedstreams were prepared as follows in which all solvents and monomers were dried and purified before use:

1. A solution of commercially available vinyl benzyl chloride (VBC) consisting if 60 weight percent of the meta-isomer and 40 weight percent of the para-isomer, methyl chloride, and purified n - hexane consisting of 3.96 wt.% VBC, 8.48 wt.% methyl chloride and 87.56 wt.% n-hexane.
2. A solution of 0.099 wt.% of ethyl aluminum dichloride in dry-purified propane.
3. n-Hexane purified by percolation through Linde 3A molecular sieves and silica gel.
4. Polymerization grade isobutylene. Feed streams 1, 3 and 4, fed to the reactor at a constant rate were mixed in a feed line, precooled to −80° C, and fed through one inlet tube. Feedstream 2, containing the catalyst was precooled to −52° C and fed to the reactor through the second inlet tube. At the start of the run the reactor was charged sufficient dry hexane to engage the propeller. All feed streams were introduced simultaneously.

Under steady state conditions of operation, flow rates of the monomers, catalyst and solvents were as follows:

| | |
|---|---|
| Vinyl Benzyl Chloride | 1.87 gms/min. |
| Isobutylene | 28.1 gms/min. |
| Hexane | 125.5 gms/min. |
| Propane | 13.6 gms/min. |
| Methyl Chloride | 4.0 gms/min. |
| $C_2H_5AlCl_2$ | 0.0136 gms/min. |

Temperature throughout the reaction was maintained at −80° C. Residence time in the reactor was about 17.5 minutes and total conversion of monomers to polymer was greater than 99 percent. VBC conversion was greater than 85% and isobutylene conversion nearly 100%. The polymer effluent was a clear orange-red cement with no visual evidence of insoluble material and on quenching with isopropyl alcohol yielded a clear, colorless cement. Catalyst efficiency realized was 2210 g/g. Analysis of the cement after removal of the alcohol by water washing followed by azeotropic dehydration showed a concentration of interpolymer in the effluent cement of 17.3 weight percent.

The polymer was recovered by precipitation in a large volume of isopropyl alcohol and after thorough washing and incorporation of 0.02 weight percent of 4,4' methylene bis [2,6 ditertbutyl phenol] as an antioxidant was dried under vacuum at 80° C. The polymer had a viscosity average molecular weight ($M_v$) of 45,000; a number average molecular weight ($M_n$) of 23,000 and gave on analysis by NMR and for chlorine, a VBC content of 2.0 mole percent. The dried polymer was readily soluble in toluene with no evidence of gel or insoluble crosslinked polymer. This example shows that polymerization according to the process of this invention yields desirable gel-free VBC-containing interpolymers.

EXAMPLE 2

Batch Slurry Polymerization

A reaction flask fitted with a stirrer, thermometer and a dropping funnel was set up in a glove box having an oxygen-free nitrogen atmosphere and the flask charged with 300 ml of methylene chloride. The flask and contents were cooled to −97° C and to the methylene chloride was added a precooled solution of 0.64 grams of VBC dissolved in 42 grams of isobutylene. A solution of 0.762 grams of $C_2H_5AlCl_2$ in 60 ml of hexane was then added to the stirred reaction mixture over the course of one hour. Difficulty was experienced in maintaining the temperature which after polymerization had begun, rose at one point from − 90° C to −44° C. The reaction was terminated at the end of one hour by the addition of 200 ml of isopropyl alcohol and recovered and dried as in Example 1. The recovered polymer contained 39 percent of insoluble gel. The soluble portion (in diisobutylene) had an inherent viscosity at 25° C of 0.5 and a VBC content by chlorine analysis of 1.9 mole percent. This example shows that polymerization by the batch slurry process employed in the prior art results in a undesirable interpolymer containing a high percentage of gel.

EXAMPLE 3

Continuous Solution Polymerization

The following four feed streams were prepared and fed to the continuous one-gallon stainless steel reactor used in Example 1:
1. A solution of commercially available VBC as used in Example 1 dissolved in a methyl chloride/hexane blend solvent. The mixture consisted of 5.99 wt.% VBC, 12.11 wt.% methyl chloride, and 81.90 wt.% n-hexane.
2. A solution of 0.0998 wt.% of ethyl aluminum dichloride in dry purified propane.
3. Dry purified n-hexane.
4. Polymerization grade isobutylene.

Feed streams 1, 3 and 4 were metered, mixed in a feed line, precooled to −95° C and fed to the annulus of the reactor. Feed stream 2 containing the catalyst, was metered and precooled to −52° c before being fed into the reactor. Reactor temperature was maintained at −85° C. Polymerization was initiated by first introducing the monomer streams into a clean, chilled, dry-solvent filled reactor and then slowly introducing the catalyst and raising the rate to initiate polymerization. Once polymerization was initiated, flow rates were adjusted to maintain the following flows into the reactor to try to establish a steady-state. Residence time at these flow rates was approximately 22 minutes.

| | |
|---|---|
| Vinyl Benzyl Chloride | 2.306 g/min. |
| Isobutylene | 24.1 g/min. |
| Hexane | 88.6 g/min. |
| Propane | 16.8 g/min. |
| Methyl Chloride | 4.66 g/min. |
| $C_2H_5AlCl_2$ (EADC) | 0.0169 g/min. |

No steady-state was established but the polymerization gradually diminished due to a build-up of poisons in the reactor. At the time of first sampling shortly after initiation, cement concentration was about 7.6% for a total conversion of monomers to polymer of about 40 percent. From the polymer composition and material balance calculations, the isobutylene conversion was about 41% and VBC conversion 37%. Catalyst efficiency was only 615 g/g and the reactor effluent was a viscous orange-red mass containing large globs of red gel. It quenched slowly upon overflowing and being mixed into the isopropanol containing vessel to yield a viscous colorless mass still containing large chunks of gel. The polymer was recovered as in Example 1. The recovered polymer contained greater than 50% gel. Molecular weights of the soluble portion were: $\overline{M}_v$ about 100,000; $\overline{M}_n$ about 20,000 and the soluble portion contained 3.2 mole % VBC. As the reactor was maintained onstream to try to establish a steady-state the polymer concentration in the effluent continually dropped indicating a steady decline in catalyst efficiency due to a build-up of poisons and the percentage of gel in the effluent polymer gradually rose. After several hours the run was terminated as polymerization had essentially ceased. This example shows that it is not feasible to run the reactor at high steady-state vinyl benzyl chloride concentration in the reactor with a relatively strong Lewis acid catalyst such as EADC. Under these conditions alkylation reactions produce gel in the polymer and also cause the build-up of polymerization poisons in the reactor which complex with the catalyst and prevent polymerization. Hence it is necessary to operate the reactor at high monomer conversion in order to make useful interpolymers of isobutylene and halomethylated aromatic vinyl compounds.

EXAMPLE 4

Continuous Solution Polymerization

The same four feed streams used in Example 3 were fed continuously into the one-gallon stainless steel reactor of Examples 1 and 3, but conditions were adjusted to fall within the ranges found to be effective in this invention. Feed streams 1, 3 and 4 were metered, mixed in a feed line, precooled to −95° C and fed to the annulus of the reactor. Feed stream 2, the catalyst was metered and precooled to −52° C before being fed into the reactor. Reaction temperature was maintained at −60° C. Polymerization was initiated by introducing monomers and catalyst simultaneously into the clean chilled, dry-solvent filled reactor as in Example 1. Feed rates were adjusted to maintain the following flows into the reactor and it was allowed to achieve a steady state:

| Vinyl Benzyl Chloride | 2.306 g/min. |
| Isobutylene | 24.1 g/min. |
| Hexane | 95.7 g/min. |
| Propane | 12.5 g/min. |
| Methyl Chloride | 4.66 g/min. |
| $C_2H_5AlCl_2$ | 0.0126 g/min. |

Residence time was approximately 21.5 minutes. Polymerization initiated smoothly and at steady state the effluent was a clear orange-red cement with no evidence of gel. It was quenched as before to yield a clear, colorless cement. Polymer concentration in the effluent was 18.7 wt.% and catalyst efficiency realized was 2100 g/g. Polymer recovered and dried as in Example 1 had an $\overline{M}_v$ of 60,000; an $\overline{M}_n$ of 25,000; and contained 3.2 mole % VBC by NMR and chlorine analyses. It was completely soluble with no traces of gel and the reactor was operating at a stable steady-state. Total monomer conversion was 99.5% with nearly 100% conversion of the isobutylene and 99.5% conversion of the vinyl benzyl chloride. At this high conversion, steady-state VBC concentration in the reactor was low enough so that alkylation reactions were avoided and reactor operation was stable to produce a desirable, completely soluble interpolymer.

EXAMPLE 5

Continuous Solution Polymerization

The following four feed streams were prepared and fed to the continuous one-gallon stainless steel reactor of Example 1:
1. A solution of commercial VBC as used in Example 1 dissolved in a methyl chloride/propane blend solvent. The mixture consisted of 7.38 wt.% VBC, 28.72 wt.% methyl chloride, and 63.9 wt.% propane.
2. A solution of 0.194% ethyl aluminum dichloride in dry purified propane.
3. Dry purified propane.
4. Polymerization grade isobutylene. Feed streams 1, 3 and 4 were metered, mixed in a feed line, precooled to −77° C, and fed to the annulus of the reactor. Feed stream 2, containing the catalyst, was metered and precooled to −50° C before being fed into the reactor. Polymerization was initiated by introducing monomers and catalyst simultaneously into the clean, chilled, dry-solvent filled reactor.

Feed rates were adjusted to maintain the following flows into the reactor:

| Vinyl Benzyl Chloride | 3.485 g/min. |
| Isobutylene | 44.9 g/min. |
| Hexane | 0.136 g/min. |
| Propane | 69.1 g/min. |
| Methyl Chloride | 13.55 g/min. |
| $C_2H_5AlCl_2$ | 0.0394 g/min. |

Residence time was approximately 22 minutes. Polymerization initiated smoothly and cement concentration rose quickly to greater than 35%. The effluent became a bright orange red paste full of chunks of gel extruding from the reactor. Reaction temperature rose quickly to −50° C and was impossible to maintain so the run had to be terminated within a short time. The effluent quenched slowly upon being mixed into the isopropanol-containing quench vessel to yield a viscous colorless mass with many gel particles. The polymer was recovered as in Example 1. The recovered polymer contained 25% gel. The soluble portion had an $\overline{M}_v$ of 25,000; an $\overline{M}_n$ of 5600; and contained 2.35 mole % VBC by analysis. Although no steady-state was ever reached because the reactor fouled so quickly, conversion was about 96% with 97.5% conversion of the isobutylene and 81.5% conversion of the VBC. Catalyst efficiency was about 1180 g/g. This example shows that it is not possible to operate the reactor at high feed monomer concentrations without encountering excessive viscosity, fouling out the reactor, and producing an undesirable gel-containing interpolymer.

EXAMPLE 6

Continuous Solution Polymerization

The same four feedstreams used in Example 5 were fed continuously into the one gallon stainless steel reactor of the previous examples but a lower catalyst rate was used to try to keep polymer concentration low enough to avoid the high viscosity related problems encountered in Example 5. The feedstreams were blended and chilled as in Example 5 and reaction was initiated in the same way. The following flows were maintained into the reactor:

| Vinyl Benzyl Chloride | 3.485 g/min. |
| Isobutylene | 44.9 g/min. |
| Hexane | 0.057 g/min. |
| Propane | 69.1 g/min. |
| Methyl Chloride | 13.55 g/min. |
| $C_2H_5AlCl_2$ | 0.0165 g/min. |

Residence time was about 22 minutes and reactor temperature was maintained at −50° C. Polymerization initiated smoothly, but then gradually died so that no steady-state was reached. The effluent became a bright orange-red viscous cement full of chunks of red gel shortly after initiation but then gradually thinned as the reactor was maintained on stream. Polymer samples quenched and recovered as in the previous examples varied widely as the run progressed but all contained considerable amounts of gel (from 10 to 75%). $\overline{M}_v$ of the soluble portion ranged from 10,000 to 50,000. There was a definite upward trend in gel content of the recovered polymer samples as the run progressed and conversion dropped. The run was aborted after ~1 hour on stream as poisons had built up in the reactor to the extent that polymerization had nearly ceased. This example shows that operation at high feed monomer concentration is not feasible even if a low polymer concentration is maintained in the reactor by limiting conversion through reduced catalyst rate. At high VBC concentrations in the reactor, alkylation reactions produce gel in the polymer and form catalyst poisons so that it is not possible to produce the desired interpolymers of this invention.

It is thus evident that soluble gel-free interpolymers can be produced only by continuous homogeneous solution polymerization within critical ranges of the control variables as specified in this invention.

EXAMPLE 7

Quaternary Ammonium Salt

A quantity of the polymer from Example 1 was dissolved in toluene and sufficient isopropyl alcohol added to give a 35 weight percent solution of polymer in a 70:30 percent by volume mixture of toluene:alcohol. The cement was charged to a 5 liter resin flask fitted with a stirrer, thermometer and reflux condenser, 1.4 times the stochiometric quantity of triethylamine based on chlorine content of the polymer was added and the reaction mixture heated with stirring under a reflux at 82° C for 4 hours. The final cement was clear, colorless and fluid. Mixing of the polymer solution with water produced a stable latex which did not separate after long standing and did not require the addition of an emulsifying agent.

The polymer was recovered for analysis by precipitating a portion of quaternized solution with an excess of alcohol, kneading it in fresh alcohol and redissolving the polymer in hexane and reprecipitating in alcohol. The alcohol-wet polymer was dried to a tough, white crumb under vacuum at 80° C. It was ionically crosslinked as shown by only partial solubility in diisobutylene, but was completely soluble when alcohol was added to solvate the ionomeric cross-links. Nitrogen and chlorine analyses showed that the chlorine had been completely converted to the quaternary ammonium salt. A film cast from the cement dried to a tough elastomeric clear film without tack. Immersion of the film in water over a period of time showed only a trace of water absorption.

The polymer of this invention containing quaternary ammonium salts either in the form of a latex or in solution, are useful as binders for non-woven fabrics, rug backings, adhesives and for use with polymer-impregnated or coated paper products. Other tertiary amines such as trimethyl amine and triethanolamine may be used to prepare quaternary salts.

EXAMPLE 8

Quaternary Phosphonium Salt

A quantity of the polymer of Example 1 was dissolved in dry, purified heptane and sufficient anhydrous isopropyl alcohol added to yield a 40 weight percent solution of polymer in a 75:25 by volume heptane-alcohol solvent. The solution was charged to a baffled 5 liter resin flask fitted with a stirrer, thermometer, reflux condenser, dropping funnel, heating jacket and nitrogen purge line and to the solution was added with stirring at room temperature, twice the stochiometric quantity of triethyl phosphine while maintaining a nitrogen seal on the reaction flask. After addition of the phosphine was complete the flask contents were heated to reflux at 77° C and stirred at the temperature for two hours. On cooling a clear, fluid cement was obtained.

A sample of the quarternized polymer was isolated for analysis as in Example 7 and was found to contain 0.95 mole percent of phosphorous indicating that only about 50 mole percent of the chlorine in the polymer had been converted to the quaternary phosphonium salt at the low temperature used for the reaction. The solution nevertheless gave a stable emulsion on mixing with water without the addition of an emulsifying agent.

EXAMPLE 9

S-Isothiouronium Salt

An isobutylene-VBC copolymer prepared as in Example 1 containing 2.2 mole percent of VBC and an $\overline{M}_v$ of 24,000 was dissolved in heptane and sufficient isopropyl alcohol added to give a clear solution containing 45 weight percent solution of polymer in a 75:25 by volume heptane-alcohol solvent. The polymer solution was transferred to the same equipment as was used for the preparation of Example 8; thiourea in an amount equal to 1.2 times the stochiometric amount of chlorine present in the polymer was added and the reaction mixture heated and stirred under reflux in a nitrogen atmosphere at 77° C for 6 hours and allowed to cool overnight. The cement was clear and colorless while hot but on cooling, excess thiourea crystallized from the solution. The clear cement was decanted from the crystals and a portion of the polymer isolated as in Example 7. The dried polymer was a clear, colorless, tough ionomerically crosslinked rubber which was only partially soluble in diisobutylene but dissolved readily when some alcohol was added to solvate the ionomeric crosslinks. Analysis showed the presence of 1.1 mole percent of sulfur and nitrogen indicating a 50 percent conversion of the chlorine in the polymer to the isothiouronium salt at the temperature used for reaction.

A film cast from the solution dried to an elastomeric clear film with a dry, non-tacky surface. Despite the low $\overline{M}_v$ of the copolymer used to prepare the isothiouronium salt, the film had a tensile strength of 220 psi and an elongation at break of 500 percent. The tackiness is much lower and the tensile strength and toughness much higher than a vulcanized isobutylene-isoprene Butyl rubber of comparable $\overline{M}_v$. The film had good hydrophobic properties as evidenced by water forming beads when placed upon it instead of spreading, water absorption of less than 1.0 percent when immersed in water at 75° C for 65 hours and an extraction loss of less than 0.02 percent under the same conditions.

The clear cement solution when poured into water readily formed a stable emulsion without the addition of an emulsifying agent.

EXAMPLE 10

Quaternary Ammonium Latex

An isobutylene-VBC copolymer containing 1.9 mole percent of VBC and an $\overline{M}_v$ of 17,000 was converted to a quaternary ammonium salt by treatment at a concentration of 40 weight percent in a solvent consisting of 75 volume percent heptane and 25 volume percent isopropyl alcohol by treatment with twice the stochiometric amount of triethylamine at 77° C for 2 hours in the same equipment as was used for the preparation of Example 7. A sample of polymer isolated for analyses from the clear, colorless polymer solution showed 1.0 mole percent of nitrogen indicating that only about 50 mole percent of the chlorine originally present in the polymer had been converted to the triethylammonium chloride, compared to 100 percent conversion achieved in Example 7, undoubtedly because of the shorter time and lower temperature of reaction.

The remainder of the clear fluid cement was mixed with distilled water in the ratio of 60 volumes of cement to 40 volumes of water whereby there was obtained a stable P/W emulsion. This emulsion was refined by passage through a colloid mill to yield a stable raw latex. The latex was stripped to remove solvents during which no foaming or instability problems were encountered to yield a concentrated commercially acceptable latex. The latex contained no emulsifier other than the cationic groups attached to the polymer chain. Films cast from the stripped latex dried to clear, tough, hydrophobic rubbery films.

What is claimed is:

1. A continuous process for the preparation of gel-free interpolymers comprised of isobutylene and a mixture of from 0.5 to 5.0 mol % meta and para chloromethyl styrene which comprises:
    (a) continuously feeding said monomers in the range of about 2 to about 20 parts by weight, about 80 to about 98 parts by weight of a solvent or mixture of solvents in which said monomers and said interpolymers are soluble and from about 0.001 to about 0.05 parts by weight of a catalyst selected from the group consisting of ethyl aluminum dichloride, ethyl aluminum sesquichloride, diethyl aluminum chloride, or boron trifluoride to a reaction zone maintained at a temperature in the range of about −120° C. to about −20° C. to form a reaction mixture;
    (b) maintaining said reaction mixture in said reaction zone at said temperature for a time sufficient to convert at least one of said monomers to said interpolymer in an amount equal to or greater than about 85 percent; and
    (c) recovering said interpolymer from the effluent reaction mixture leaving said reaction zone.

2. A continuous process for the preparation of gel-free interpolymers comprised of
    a. about 0.5 to 5.0 mole percent of a mixture of 3-chloromethyl styrene and 4-chloromethyl styrene and
    b. one or more monoolefins represented by the formula $R'(R'')C = CH_2$ wherein $R'$ and $R''$ are independently selected from the group consisting of $C_1$ to $C_{15}$ alkyl, aryl, alkylaryl, arylalkyl and cycloalkyl radicals, which comprises:
    (A) continuously feeding to a reaction zone the monomers, solvent system and a soluble catalyst selected from the group consisting of ethyl aluminum dichloride, ethyl aluminum sesquichloride and diethyl aluminum chloride, said catalyst being fed to said reaction zone in a concentration in the range of 0.001 to 0.05 weight percent of the total of the monomers and solvents at the said reaction zone.
    (B) maintaining the reaction mixture in the reaction zone at a temperature from −120° C. to −20° C. for a time sufficient to convert at least one of the monomers to the interpolymer in an amount equal to or greater than 85 percent; and
    (C) recovering the interpolymer from the effluent reaction mixture leaving the reaction zone.

* * * * *